United States Patent [19]

Arnold

[11] 4,012,580
[45] Mar. 15, 1977

[54] ELECTRICAL WIRING BOX
[75] Inventor: William O. Arnold, Parkersburg, W. Va.
[73] Assignee: Union Insulating Company, Parkersburg, W. Va.
[22] Filed: Oct. 14, 1975
[21] Appl. No.: 621,688
[52] U.S. Cl. ................................. 174/53; 220/3.2
[51] Int. Cl.[2] ........................................ H02G 3/08
[58] Field of Search ................ 174/53, 58; 220/3.2, 220/3.3, 3.4, 3.5; 85/36

[56] References Cited
UNITED STATES PATENTS

| 3,575,313 | 4/1971 | Trachtenberg et al. | 220/3.3 |
| 3,876,821 | 4/1975 | Pringle | 174/53 |
| 3,895,732 | 7/1975 | Robinson et al. | 220/3.5 |

Primary Examiner—J. V. Truhe
Assistant Examiner—D. A. Tone
Attorney, Agent, or Firm—Peter Xiarhos; Elmer J. Nealon; Norman J. O'Malley

[57] ABSTRACT

An electrical wiring box having a pair of mounting elements associated therewith for permitting the quick and easy mounting of an electrical device within the wiring box. The wiring box includes first and second mounting portions each having a central opening and a pair of slots on opposite sides of the central opening. Each of the mounting elements includes a screw-receiving section adapted to be inserted into the central opening of a corresponding one of the mounting portions of the wiring box, and a pair of locking tabs adapted to be inserted into the pair of slots in the corresponding one of the mounting portions for attaching the mounting element to the wiring box and for properly positioning the screw-receiving section within its corresponding central opening. Each of the screw-receiving sections includes three thread-engaging members arranged to define a screw-receiving region therebetween and each having a deflectible thread-engaging tip directed into the screw-receiving region.

An electrical device is mounted within the wiring box by simply pushing associated screws into the screw-receiving sections of the mounting elements, whereby the thread-engaging tips of the screw-receiving sections are caused to be deflected outwardly. When each of the screws has been completely inserted into its associated screw-receiving section, the thread-engaging tips of the section come to rest in three different regions between threads of the screw, thereby firmly gripping onto the screw.

The mounting elements further include flat portions connected with the screw-receiving sections and the locking tabs and having openings therein for mounting the wiring box to a supporting structure such as wallboard or panelling.

11 Claims, 6 Drawing Figures

ELECTRICAL WIRING BOX

BACKGROUND OF THE INVENTION

The present invention relates to an electrical wiring box adapted to receive and support therein an electrical device such as a receptacle or switch and, more particularly, to an electrical wiring box having mounting elements associated therewith for permitting the quick and easy mounting of an electrical device within the wiring box.

At the present time electrical devices such as receptacles and switches are most commonly mounted within electrical wiring boxes by means of screws associated with the electrical devices and threaded into openings provided in ears or bosses of the wiring boxes. Since the screws are usually of find pitch and of considerable length, to accommodate several possible thicknesses of wallboard or panelling, considerable time is required to completely thread a pair of the screws into the tabs or bosses of a wiring box to tightly secure an electrical device to the wiring box. As a result, and in the interest of reducing escalating labor costs, it has been found highly desirable to reduce the time and effort required to mount electrical devices within wiring boxes.

Numerous attempts have been made and several proposals offered directed to a solution to the above-stated problem. By way of example, in U.S. Pat. No. 3,403,214, there is described an electrical device (receptacle or switch) having a strap portion associated therewith and a pair of fasteners used in conjunction with openings in the strap portion for mounting the electrical device to a pair of mounting ears of an electrical wiring box. One of the fasteners is a conventional mounting screw adapted to be inserted into a first opening in the strap portion of the electrical device and to be threaded into a threaded opening of one of the ears of the wiring box, and the other fastener is a special elongated serrated member extending normally from the strap portion and adapted to be freely inserted into a threaded opening of the other ear of the wiring box. To mount the electrical device to the wiring box, the special serrated fastener is first freely inserted completely within the opening of the associated ear and the mounting screw is then threaded into the threaded opening of its associated ear. As the mounting screw is threaded into its associated ear opening, a part of the strap portion of the electrical device physically coacts with the mounting screw and causes the electrical device to move along a longitudinal axis thereof to cause the serrations of the serrated fastener to move into physical contact with and firmly engage the threads of its associated ear opening. As a result, the electrical device is attached to the wiring box. Variations and modifications of the above-described arrangement, utilizing electrical devices having specially-modified strap portions and special serrated or threaded fasteners, are also described in U.S. Pat. Nos. 3,403,215 and 3,403,216. Further, in U.S. Pat. No. 3,403,218, there is described a mounting arrangement utilizing an electrical device having a specially-modified strap portion and a pair of special eccentric mounting screws, the latter screws being freely and fully insertable within threaded openings in associated ears and then capable of rotation to cause the threads thereof to move into physical contact with and engage the threads of the associated threaded ear openings.

Still other solutions to the aforedescribed problem are described in U.S. Pat. Nos. 3,526,703, 3,876,821 and 3,895,732. In U.S. Pat. No. 3,526,703 a mounting arrangement is described which includes a pair of side-by-side mounting lugs mounted for pivotal movement on each of two opposing walls of a wiring box. The mounting lugs of each pair of lugs have adjacent threaded concavities cooperating to define an internally-threaded opening for threadably receiving therein an associated screw for mounting an electrical device to the wiring box. To mount the electrical device to the wiring box, a pair of screws are first pushed for essentially their full length through the openings defined in the pairs of lugs. This pushing action causes the lugs of each pair to move away from each other. The screws are then tightened for a few turns as a result of which the lugs of each pair move back toward each other to provide securement of the electrical device to the wiring box.

In U.S. Pat. No. 3,876,821, a mounting arrangement is described which includes a pair of insert members, each fixedly disposed within a corresponding opening or channel in a boss of a wiring box and each having a thread-engaging tab portion adapted to physically engage a region between adjacent threads of a screw following the insertion of the screw into the opening. To mount an electrical device to the wiring box, the screws associated with the electrical device are pushed into the openings in the bosses of the wiring box, causing the thread-engaging tab portions of the insert members to deflect outwardly slightly as the screws pass into the openings. When the screws have been pushed completely into the openings, the thread-engaging tab portions fall between and come to rest between adjacent threads of the screws, thereby mounting the electrical device within the wiring box.

In U.S. Pat. No. 3,895,732, a mounting arrangement is described which includes a pair of generally triangular shaped screw-retaining clips which are arranged to be inserted into corresponding generally triangular shaped openings in a wiring box. Each of the clips has a plurality of tines for physically cutting or biting into the walls of the corresponding opening of the wiring box, thereby to secure the clip to the wiring box, and each of the clips has a plurality of thread-engaging flanges or tips for engaging a screw inserted into a central region of the clip. To mount an electrical device within the wiring box, the screws associated with the electrical device are pushed into the central regions of the screw retaining clips, causing the thread-engaging flanges to deflect outwardly slightly as the screws pass into the central regions. When the screws have been inserted completely into the central regions of the clips, the thread-engaging flanges fall between and come to rest in different regions between threads of the screws thereby gripping onto the screws.

While the mounting arrangements of the aforedescribed patents appear to represent reasonable solutions to the problem of mounting electrical devices within wiring boxes, these mounting arrangements have a number of disadvantages associated therewith. Specifically, in the case of U.S. Pat. Nos. 3,403,214; 3,403,215; 3,403,216 and 3,403,218, the mounting arrangements described therein require specially-modified electrical devices (strap portions) and special fasteners (serrated mounting members and mounting screws), all of which are difficult and costly to manufacture. In the case of U.S. Pat. No. 3,526,703, the mounting arrangement described therein, utilizing two pairs of pivoting lugs mounted to a wiring box and each having a threaded concavity therein, is also difficult and costly to manufacture, particularly on a mass-production, volume basis, and especially if the wiring box with which the mounting arrangement is to be used is of a molded plastic composition. In the case of U.S. Pat. No. 3,876,821, the insert members may be rendered inoperative if particles of plasterboard, drywall or other material get into an insert member and/or the threads of a mounting screw and prevent the thread-engaging tab portion of the insert member from engaging the region between adjacent threads of the mounting screw. In this situation, the thread-engaging tab portion of the insert member, rather than engaging a region between adjacent threads of the screw, may instead ride on the rim of a thread of the screw, leading to the possible undesirable removal of the screw from the insert member and, thus, the possible loosening or, even worse, the withdrawal of the electrical device from the wiring box. In the case of U.S. Pat. No. 3,895,732, the retention of the screw-retaining clips in the openings in the wiring box is accomplished entirely by the physical cutting or biting effects of the small tines of the clips. While this type of biting action may be suitable for "soft" (e.g., thermoplastic) plastic boxes, it cannot practicably be achieved with "hard," brittle (e.g., thermosetting) plastic boxes, the material of which is ordinarily too hard to permit the type of cutting or biting contemplated in U.S. Pat. No. 3,895,732.

BRIEF SUMMARY OF THE INVENTION

In accordance with the present invention, a box arrangement is provided which avoids the problems and disadvantages of prior art arrangements as described hereinabove. The box arrangement of the present invention includes a mounting member of novel design used with a box such as an electrical wiring box. The box includes a plurality of walls arranged to define a space for receiving a device in the aforesaid space and further includes a mounting portion having first and second openings therein spaced from each other. The mounting member used with the above-described box generally comprises a screw-receiving section and a locking element. The screw-receiving section is disposed within the first opening in the mounting portion of the box and includes a plurality of thread-engaging members disposed along the axis of the first opening, the thread-engaging members being arranged to define a region therebetween for receiving a screw. The thread-engaging members include tabs directed toward the axis of the first opening, these tabs being capable of being deflected by a screw when the screw is forced into the region between the thread-engaging members and of coming to rest in regions between threads of the screw when the screw has been completely inserted into the region between the thread-engaging members.

The above-mentioned locking element is connected with the screw-receiving section and cooperates with the second opening in the mounting portion of the box for securing the mounting member to the box.

BRIEF DESCRIPTION OF THE DRAWING

Various objects, features and advantages of an electrical wiring box in accordance with the present invention will be apparent from the following detailed description taken in conjunction with the accompanying drawing in which.

DETAILED DESCRIPTION OF THE INVENTION

Figure 1:
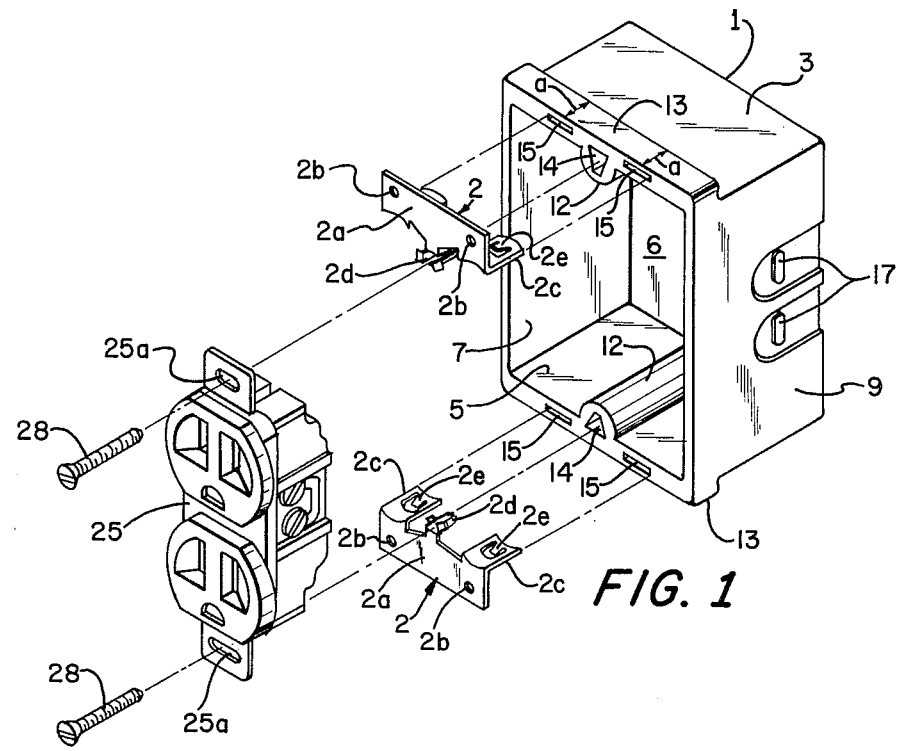
FIG. 1 is an exploded view illustrating an electrical wiring box used in conjunction with a pair of mounting elements in accordance with the present invention for mounting an electrical device within the electrical wiring box.

Referring now to FIG. 1, there is shown in an exploded view an arrangement including an electrical wiring box 1 as employed in accordance with the present invention with a pair of mounting elements 2 to mount an electrical device 25 within the wiring box 1. As shown in FIG. 1, the electrical wiring box 1 includes a top wall 3, a bottom wall 5, a rear wall 6, and a pair of side walls 7 and 9. These walls define an opening at the front of the wiring box 1 and further enclose a space or volume for receiving an electrical device such as an electrical switch or receptacle as well as wires and other electrical connections associated with the electrical device. The wiring box 1 further includes a pair of bosses 12 formed integrally with the top and bottom walls 3 and 5 of the wiring box 1 and a pair of mounting portions or rims 13 integral with and extending normally from the top and bottom walls 3 and 5. Each of the bosses 12 has a generally-triangular shaped opening 14 therein and each of the rims 13 has a pair of generally-rectangular shaped openings or slots 15 therein on opposite sides of a corresponding one of the boss openings 14. Each of the openings 14 and 15 has a depth "a," as shown in FIG. 1, equal to the depth of the rims 13. The side wall 9 further includes knockout elements 17 which may be removed selectively as desired to make electrical connections to an electrical device which is to be mounted within the wiring box 1.

Figure 2:
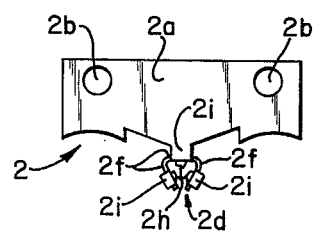
FIGS. 2, 3 and 4 are front, top and side views, respectively, of a mounting element in accordance with the invention.
Figure 4:
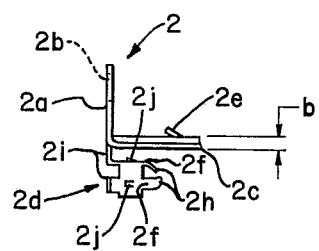
Figure 3:
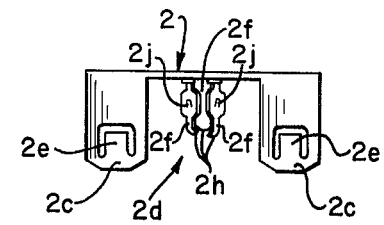
Figure 6:
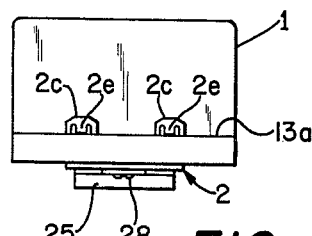

An electrical device is mounted within the wiring box 1 by use of the aforementioned mounting elements 2, each of which is mounted to the wiring box 1, as indicated in FIG. 1, by use of the openings 14 and 15. As shown in FIGS. 1–4, each of the mounting elements 2, typically of stamped sheet metal, includes a flat portion 2a having a pair of spaced openings 2b therein, a pair of slightly-bowed or arched tabs 2c integral with and generally normal to the flat portion 2a, and a screw-receiving central portion 2d intermediate to the tabs 2c and having a central axis normal to the plane of the flat portion 2a. The tabs 2c of the mounting elements 2 are locking elements and are adapted to be inserted into the openings 15 in the rims 13 of the wiring box 1 to secure the mounting elements 2 to the wiring box 1 and to properly position the central portions 2d of the mounting elements 2 within the openings 14. As best shown in FIGS. 3 and 4, each of the tabs 2c has a small locking tip 2e extending outwardly therefrom at a small angle and in a direction toward the plane of the flat portion 2a. The tabs 2c are dimensioned so that when they are forced into the openings 15 in the rims 13, the locking tips 2e thereof become slightly compressed as they pass through the openings 15 and expand outwardly again when they emerge from the rear of the openings 15. When the tabs 2c are fully inserted into the openings 15, the tips 2e abut against rear surfaces 13a of the rims 13, as indicated in FIG. 6, thereby locking the mounting elements 2 securely to the wiring box 1. The locking of the mounting elements 2 to the wiring box 1 is enhanced by the slightly-bowed or arched nature of the locking tabs 2c, the maximum height of these tabs, shown at "b" in FIG. 4, being essentially equal to the height of the openings 15 in the rims 13 thereby to establish a tight fit for the tabs 2c within the openings 15 when the tabs 2c are forced into the openings 15.

The aforementioned central portions 2d of the mounting elements 2 are screw-receiving elements of a type as generally described in U.S. Pat. No. 3,895,732. These portions are arranged, as indicated in FIG. 1, to be positioned and lie within the generally triangular-shaped openings 14 of the bosses 12. As best shown in FIGS. 2-4, the central portion 2d of each of the mounting elements 2 has a generally-triangular configuration, to conform to the shape of one of the openings 14, and includes three members 2f arranged angularly with respect to each other and interconnected to provide the aforesaid triangular configuration. Each of the three members 2f has a thread-engaging flange or tip 2h at one end thereof, a flared portion or locking tip 2i at the other end thereof, and a small tine 2j formed at a central region thereof. As further indicated in FIGS. 2-4, and as will be described in further detail hereinafter, the members 2f are of slightly different lengths to allow the thread-engaging tips 2h thereof to engage different regions between adjacent threads of a screw when the screw is forced into the central portion 2d of the mounting element 2. Alternatively, two of the members 2f may be of the same length with the remaining member 2f of a different length. When the central portions 2d of the elements 2 are properly positioned within the openings 14, the locking tips 2i of the mounting elements 2 abut against the front surfaces of the bosses 12 and the rims 13 to limit the movement of the central portions 2d into the openings 14, and the tines 2j of the elements 2 press against the inner walls of the bosses 12 surrounding the openings 14 to aid in establishing a tight fit for the central portions 2d within the openings 14. There is no need to specifically lock the central portions 2d within the openings 14 to prevent their removal or retraction from their positions within the openings 14 since this function is performed by the aforedescribed tabs 2c by virtue of their locking the entire mounting elements 2 to the wiring box 1 and thereafter prevent longitudinal movement of the central portions 2a within the openings 14.

The wiring box 1 as described hereinabove is mounted to a supporting structure, for example, to wallboard or panelling, by using the aforementioned flat portions 2a of the mounting elements 2. More specifically, the wiring box 1 is first inserted in a conventional fashion into a rectangular opening in the supporting structure and then secured to the supporting structure by inserting screws (not shown) within the openings 2b in the flat portions 2a of the mounting elements 2 and threading the screws into the supporting structure.

Figure 5:
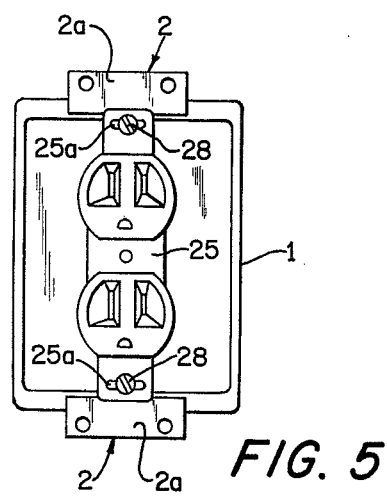
FIGS. 5 and 6 are front and top views, respectively, of the electrical wiring box shown in FIG. 1 as assembled together with the mounting elements and an electrical device in accordance with the invention.

To mount an electrical device within the abovedescribed wiring box 1, for example, an electrical device 25 in the form of a duplex receptacle as shown in FIGS. 1, 5 and 6, it is only required that a pair of screws 28 be inserted through a corresponding pair of standard openings 25a in the electrical device 25 and then pushed into the central portions 2d of the mounting elements 2. As the screws 28 are pushed into the central portions 2d, the screws 28 temporarily force or deflect the thread-engaging tips 2h outwardly, causing the tips 2h to ride on the outer surfaces or rims of the threads of the screws 28. When each of the screws 28 has been pushed completely home, the tips 2h of the associated central portion 2d come to rest in regions, or valleys, between adjacent threads of the screw 28, thereby gripping the screw 28 in different places and firmly holding the screw 28 in position. Removal of the screw 28 is accomplished, if desired, by unthreading or backing off the screw 28 in the usual manner with a tool such as a screwdriver.

The abovedescribed arrangement of the central portions 2d, comprising members 2f of different lengths and having the three thread-engaging tips 2h, offers a significant advantage over single-tip screw-gripping arrangements as described in the prior art (e.g., U.S. Pat. No. 3,876,821). Specifically, the three members 2f of each of the central portions 2d, by virtue of gripping a screw in three places, provide greater holding power and minimize the possibility of the screw falling out of or being pulled out of its associated central portion 2d. Further, in the event particles of wallboard or other foreign matter find their way into the central portion 2d, the chances of at least one of the tips 2h gripping the screw are greater than if only one tip is used (as in the case of the device described in U.S. Pat. No. 3,876,821). In addition to the above advantages, the use of the tabs 2c and the associated openings 15 provides a sure manner of positioning the central portions 2d of the mounting elements 2 within the openings 15, without relying solely on the "biting" or cutting effects of tines, and thus eliminates the need to specifically lock the central portions 2d within their associated openings (as in the case of U.S. Pat. No. 3,895,732). Further, the flat portions 2a of the mounting elements 2, in addition to being used to mount the wiring box 1 to a supporting structure, also serve as convenient interconnecting portions for interconnecting the tabs 2c and the central portions 2d.

While there has been described what is considered a preferred embodiment of the invention, it will be obvious to those skilled in the art that various changes and modifications may be made therein without departing from the invention as called for in the appended claims.

What is claimed is:

1. A box arrangement comprising:
a box including a plurality of walls arranged to define a space for receiving a device in said space, said box further including a mounting portion extending generally transversely from one of the walls of the box and having a first surface and a second surface and first and second openings spaced from each other with the second opening extending through the mounting portion from the first surface to the second surface, said second opening having a predetermined height in the direction of the mounting portion and being surrounded by the material of the mounting portion; and a mounting member comprising:
a screw-receiving section disposed within the first opening in the mounting portion, said screw-receiving section including a plurality of thread-engaging members disposed along the axis of the first opening and arranged to define a region therebetween for receiving a screw, said thread-engaging members including tabs directed toward the axis of the first opening and capable of being deflected by a screw when the screw is forced into the region between the thread-engaging members and of coming to rest in regions between threads of the screw when the screw has been completely inserted into the region between the thread-engaging members;

a unitary bowed locked element connected with the screw-receiving section and having a maximum height essentially equal to the height of the second opening in the mounting portion, said locking element being disposed within the second opening in the mounting portion with a point along its bowed surface abutting against an edge surface of the second opening; and a projection extending outwardly from the bowed surface of the locking element at an acute angle and having a free end, said projection being outside of the second opening in the mounting portion with the free end thereof abutting angularly against the second surface of the mounting portion along a line generally transverse to the aforesaid one of the walls of the box following the insertion of the locking element into the second opening, said free end of the projection facing in a direction toward the first and second surfaces of the mounting portion.

2. A box arrangement in accordance with claim 1 wherein the thread engaging members of the screw-receiving section include members of different lengths.

3. A box arrangement in accordance with claim 1 wherein:

the thread-engaging members of the screw-receiving section further include front tab portions abutting against the front surface of the mounting portion of the box for limiting the extent of insertion of the screw-receiving section into the first opening.

4. A box arrangement in accordance with claim 3 wherein:

the thread-engaging members of the screw-receiving section include members of different lengths.

5. A box arrangement comprising:

a box including a plurality of walls arranged to define a space for receiving a device in said space, said box further including first and second mounting portions extending generally transversely from predetermined walls of the box and each mounting portion having a front surface and a rear surface and first, second and third openings therein, the second and third openings being on opposite sides of the first opening, each of said second and third openings further extending through the associated mounting portion from the front surface to the rear surface and having a predetermined height in the direction of the associated mounting portion and surrounded by the material of the mounting portion;

a first mounting member, comprising:

a first screw-receiving section disposed within the first opening in the first mounting portion;

first and second unitary bowed locking elements connected with the first screw-receiving section and having maximum heights essentially equal to the heights of the second and third openings in the first mounting portion, said first and second locking elements being inserted within the second and third openings, respectively, in the first mounting portion with points along the bowed surfaces of the locking elements abutting against corresponding edge surfaces of the second and third openings; and first and second projections extending outwardly at acute angles from the bowed surfaces of the first and second locking elements, respectively, and each having a free end, said projections being outside of the second and third openings in the first mounting portion with the free end thereof abutting angularly against the rear surface of the first mounting portion along lines generally transverse to the wall of the box from which the first mounting portion extends following the insertion of the first and second locking elements into the second and third openings, said free ends of the first and second projections facing in a direction toward the front and rear surfaces of the first mounting portion; and a second mounting member, comprising:

a second screw-receiving section disposed within the first opening in the second mounting portion;

first and second unitary bowed locking elements connected with the second screw-receiving section and having maximum heights essentially equal to the heights of the second and third openings in the second mounting portion, said first and second locking elements being inserted within the second and third openings, respectively, in the second mounting portion with points along the bowed surfaces of the locking elements abutting against corresponding edge surfaces of the second and third openings; and first and second projections extending outwardly at acute angles from the bowed surfaces of the first and second locking elements, respectively, and each having a free end, said projections being outside of the second and third openings in the second mounting portion with the free ends thereof abutting angularly against the rear surface of the second mounting portion along lines generally transverse to the wall of the box from which the second mounting portion extends following the insertion of the first and second locking elements into the second and third openings, said free ends of the first and second projections facing in a direction toward the front and rear surfaces of the second mounting portion;

each of the screw-receiving sections including a plurality of thread-engaging members disposed along the axis of the corresponding first opening and arranged to define a region therebetween for receiving a screw, said thread-engaging members including tabs directed toward the axis of the corresponding first opening and capable of being deflected by a screw when the screw is forced into the region between the thread-engaging members and of coming to rest in regions between threads of the screw when the screw has been completely inserted into the region between the thread-engaging members.

6. A box arrangement in accordance with claim 5 wherein:

the first and second mounting members further comprise portions interconnected with the first and second screw-receiving sections and the corresponding pairs of locking elements for mounting the box to a supporting structure.

7. A box arrangement in accordance with claim 5 wherein:
the thread-engaging members of each of the screw-receiving sections include members of different lengths.

8. A box arrangement in accordance with claim 5 wherein the thread-engaging members of each of the screw-receiving sections further include:
front tab portions abutting against the front surface of the corresponding mounting portion of the box for limiting the extent of insertion of the screw-receiving section into its corresponding first opening.

9. A box arrangement in accordance with claim 8 wherein the thread-engaging members of each of the screw-receiving sections include members of different lengths.

10. A box arrangement in accordance with claim 9 wherein:
the first and second mounting members further comprise portions interconnected with the first and second screw-receiving sections and the corresponding pairs of locking elements for mounting the box to a supporting structure.

11. A box arrangement in accordance with claim 10 wherein:
the first openings of the first and second mounting portions are generally-triangular in configuration; and
the thread-engaging members of each of the screw-receiving sections are arranged in a generally-triangular configuration to conform to the generally-triangular configuration of the corresponding first opening.

* * * * *